Figure 3:
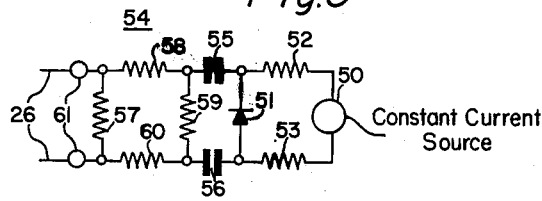

Dec. 2, 1952     A. COTSWORTH, III     2,620,438
NOISE-FACTOR METER
Filed April 7, 1951     2 SHEETS—SHEET 1
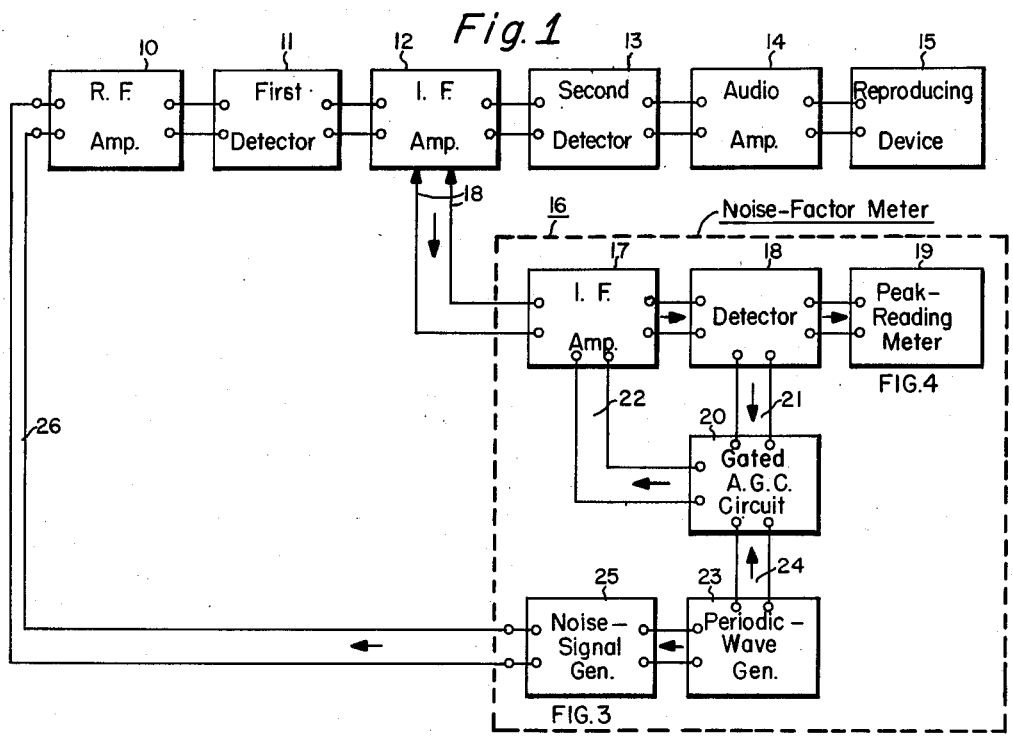
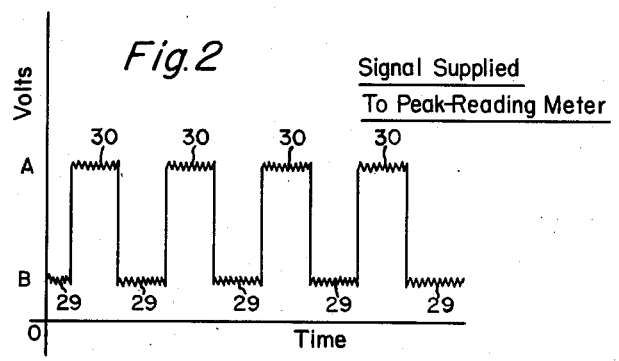
INVENTOR.
ALBERT COTSWORTH III
BY *Francis W. Crotty*
ATTORNEY Dec. 2, 1952   A. COTSWORTH, III   2,620,438
NOISE-FACTOR METER
Filed April 7, 1951   2 SHEETS—SHEET 2

INVENTOR.
ALBERT COTSWORTH III
BY Francis W. Crotty
ATTORNEY

Patented Dec. 2, 1952

2,620,438

UNITED STATES PATENT OFFICE 2,620,438

NOISE-FACTOR METER

Albert Cotsworth, III, Oak Park, Ill., assignor to Zenith Radio Corporation, a corporation of Illinois Application April 7, 1951, Serial No. 219,865

5 Claims. (Cl. 250—29)

This invention relates to a meter for measuring the noise factor of apparatus such as wave-signal receivers and the like, and more particularly to an improved meter capable of being calibrated to provide a direct reading of noise-factor. The term "noise factor" as employed herein may be defined as a factor which designates the intensity of random noise generated internally of a wave signal receiver in the absence of a received signal.

The performance of a wave-signal receiver during the reception of relatively weak signals is dependent upon the noise factor of the receiver even when its gain is adequate. For this reason, it is highly desirable that a receiver have a relatively low noise factor and it is necessary to have measuring equipment to determine whether the noise factor of the receiver falls within a permissible or usable range.

Heretofore, the procedures followed in measuring noise factor have been somewhat complicated. One method consists in connecting a power-indicating meter to the output terminals of the intermediate-frequency amplifier of the receiver under test, and obtaining a reading of the level of the signal output in the absence of an applied signal. A calibrated noise source is then connected to the input terminals of the receiver and the level of the input signal is adjusted until the reading of the meter is doubled. When this condition obtains, the level of noise produced by the calibrated source is equal to the noise produced by the receiver in the absence of an applied signal and is an indication of the noise factor of the receiver.

The improved noise-factor meter of this invention may be calibrated to provide a direct reading of noise factor of the apparatus under test, thus eliminating much of the involved procedure of the prior art. This meter, therefore, enables the noise factor of a wave-signal receiver to be measured quickly and conveniently, and aids in expediting the manufacturing processes.

It is, accordingly, an object of this invention to provide an improved meter for measuring the noise factor of a wave-signal receiver, or other apparatus, in a rapid and expeditious manner.

A further object of the invention is to provide an improved noise-factor meter which may be calibrated to furnish a direct indication of noise factor.

The noise-factor meter of this invention comprises an amplifier having an input circuit for receiving signals from a receiver under test and also having an output circuit. A noise signal generator is provided for applying an input signal of substantially constant intensity to the receiver under test during spaced operating intervals. A gain control circuit is coupled to the amplifier for establishing the intensity of the signal output of the amplifier at a reference level, but which is responsive only during intervals interposed between the above-mentioned spaced intervals. Finally, a peak-reading device is coupled to the output circuit of the amplifier for indicating the peak amplitude of the output signal of the amplifier.

Figure 4:
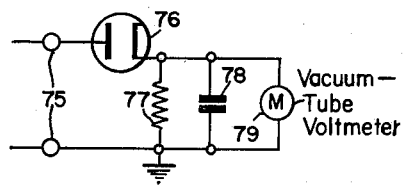
Figure 5:
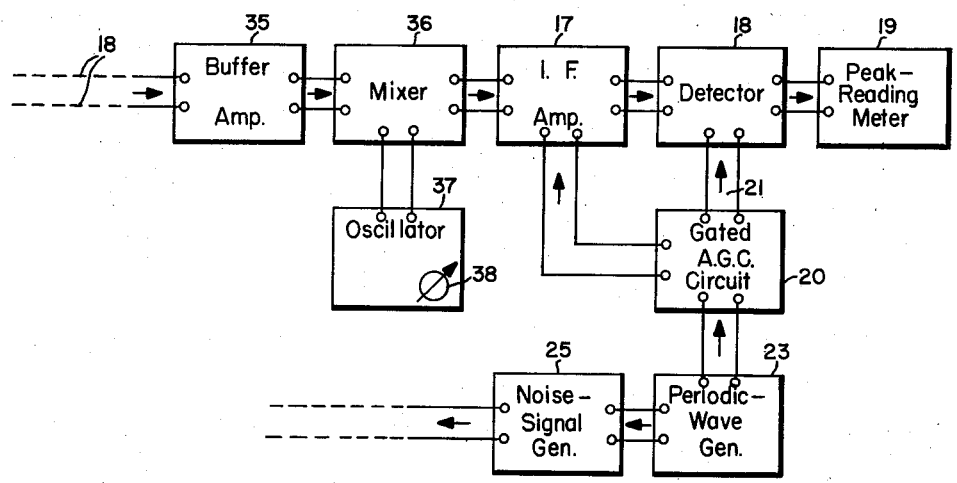

The features of this invention which are believed to be new are set forth with particularity in the appended claims. The invention itself, however, together with further objects and advantages thereof may best be understood by reference to the following description when taken in conjunction with the accompanying drawings, in which:

Figure 1 shows in schematic form the improved noise-factor meter of this invention as connected to a wave-signal receiver which, in this instance, constitutes the apparatus under test, Figure 2 is a graph useful in understanding the operation of the noise-factor meter, Figures 3 and 4 are detailed diagrams of certain components of the meter, and, Figure 5 is a schematic representation of a modification of the invention.

The wave-signal receiver of Figure 1 includes a radio-frequency amplifier 10, a first detector 11 and an intermediate-frequency amplifier 12, all connected in cascade in well-known fashion. The output terminals of intermediate-frequency amplifier 12 are connected to a second detector 13 which, in turn, is connected through an audio amplifier 14 to a signal reproducing device 15. It will be apparent as the description proceeds that this receiver may be a radio or television receiver, or any other apparatus whose noise factor is to be measured.

The operation of the receiver is well known. Briefly, a sound-modulated wave signal applied to the input terminals of amplifier 10 is amplified therein and heterodyned to the selected intermediate frequency of the receiver in first detector 11. The intermediate-frequency signal from detector 11 is amplified in intermediate-frequency amplifier 12 and detected in second detector 13. The resulting audio signal is amplified in amplifier 14 and the sound intelligence represented thereby is reproduced in reproducing device 15.

The noise-factor meter 16 of this invention may be utilized to measure the noise factor of the afore-described wave-signal receiver. Meter 16 comprises a signal amplifier, shown as an intermediate-frequency amplifier 17 responding to the same intermediate frequency as amplifier 12 of the receiver under test. The input terminals of amplifier 17 are connected to an output circuit of amplifier 12 by any suitable means 18. For example, probes may be used so that meter 16 may be quickly and releasably coupled to amplifier 12, permitting the signals developed by amplifier 12 to be applied to amplifier 17. The output terminals of amplifier 17 are connected to a signal detector 18 which, in turn, is connected to a peak-reading meter 19 to be described in detail in conjunction with Figure 4. Meter 16 also includes a gated automatic-gain-control (A. G. C.) circuit 20 having one set of input terminals connected to detector 18 by leads 21 and output terminals connected to amplifier 17 by leads 22. The gated AGC circuit must be sufficiently sensitive to respond to variations in the noise signals developed by the various receivers under test, and may be generally similar in construction to the circuit disclosed in copending application Serial No. 39,368, filed July 17, 1948, which matured into U. S. Patent No. 2,593,011 on April 15, 1952, to Albert Cotsworth, III, entitled "Automatic Gain Control for Television Receivers," assigned to the present assignee. The AGC circuit has another set of input terminals connected to a periodic-wave generator 23 by leads 24. Preferably generator 23 produces a signal of square wave form and positive half cycles thereof gate the gain control circuit to respond to the output signal of detector 18. A noise-signal generator 25, to be described in detail in conjunction with Figure 3, has a pair of input terminals connected to other output terminals of generator 23 so that the signal obtained therefrom is 180 degrees out of phase with that supplied by AGC circuit 20. The output terminals of noise signal generator 25 may be connected to the input terminals of radio-frequency amplifier 10 by leads 26. Preferably, generator 25 provides an output signal of constant average intensity but only during positive half cycles of the controlling signal applied thereto from unit 23.

In considering the operation of meter 16, it will be clear that the keying of noise generator 25 by generator 23 causes the receiver under test to experience in alternation intervals of no signal input and intervals of noise signal input. During intervals when no signal is applied to the receiver, the output signal obtained therefrom is entirely internally generated noise and is amplified by intermediate-frequency amplifier 17, detected in detector 18, and applied to peak-reading meter 19 of unit 16. The detected noise signal is impressed on AGC circuit 20 which responds thereto because generator 23 gates circuit 20 into responding during the no-input intervals of the receiver under test. The AGC circuit produces an AGC potential on leads 22 to control the gain of amplifier 17 in accordance with the intensity of the signal output of the receiver in the absence of an applied signal. The effect of the AGC circuit is to so control the gain of amplifier 17 that a substantially constant signal amplitude is supplied to detector 18, regardless of the intensity of the noise signal actually developed internally of the receiver.

Since the square-wave signals delivered by generator 23 to AGC circuit 20 and to generator 25 are 180 degrees out of phase, the noise generator is activated and supplies a noise signal of constant amplitude to the input terminals of the receiver at spaced intervals during which AGC circuit 20 is disabled. Obviously, the output signal of the receiver in the presence of this applied signal is of greater intensity than that produced when no signal is applied to the receiver and it is registered on peak-reading meter 19. Since AGC circuit 20 is disabled during the intervals when generator 25 is activated, the output signal of the receiver during such intervals has no effect on the gain-control system so that the gain of amplifier 17 remains at the value established by the afore-described noise signal generated by the receiver during the absence of an applied signal. The keying of noise-signal generator 25 is carried on at a sufficiently high rate that the AGC circuit of the receiver does not respond by any appreciable amount during the intervals when the signal from this generator is applied to the input terminals of the receiver.

The wave-form of the signal applied to peak-reading meter 19 by detector 18 is shown in Figure 2. The low-intensity portions 29 represent the meter signal during intervals when no signal is applied to the receiver and its amplitude level B is established by AGC circuit 20. The high-intensity portions 30 of the curve represent the signal applied to meter 19 during interposed intervals when noise generator 25 is activated and gated AGC circuit 20 disabled. The amplitude level A thereof is determined by the amplitude of the noise signal from generator 25 and the amplification of amplifier 17 which is the same for components 30 as for the low-intensity components 29.

In interpreting the value of amplitude level A, it is to be remembered that noise generator 25 produces a noise signal of fixed amplitude, and as a consequence the level A or the reading of meter 19 for any apparatus tested is determined by the gain of amplifier 17 which, in turn, is determined by the noise factor, that is, the signal output developed by such apparatus in the absence of a received signal. In other words, level B is maintained constant for all apparatus tested by the noise factor meter 16, while level A varies with the noise factor of each apparatus. Since meter 19 is a peak-signal indicator, it reads only the level A and indicates noise factor. If the meter is properly calibrated, it provides a direct reading of noise factor.

The meter may be calibrated by connecting it in turn to various receivers or the like of known noise factor, and by plotting the meter readings against the known values of noise factor to obtain a calibration curve for the meter.

Figure 3 is a detailed representation of noise-signal generator 25 which includes a constant-current source 50 which may conveniently be a pentode tube connected in well-known fashion. Source 50 is connected to a germanium or silicon crystal 51 through a pair of isolating resistors 52 and 53, and the crystal in turn is coupled to a network 54 through a pair of coupling capacitors 55, 56. Network 54 comprises a plurality of resistors 57—60 connected in the illustrated manner to constitute a matching network for matching the impedance of the noise generator with that of the apparatus under test. The polarity of current source 50 is such that the current flows through crystal 51 in the reverse, or high-resistance direction, and as a result a noise signal is developed at output terminals 61 which are connected by leads 26 to the apparatus under test. The current through crystal 5I is constant, and due to the characteristics of the crystal a noise signal of constant average intensity is developed thereacross. The source 50 may be keyed by generator 23 in any well-known manner so that the noise signal is developed during spaced intervals, as previously discussed. This may be accomplished by applying the control signal from generator 23 to the first or control grid of the pentode. The noise-signal generator 25 illustrated in Figure 3 is well-known per se and is shown merely by way of example. Of course, any other well known type of noise-signal generator capable of generating a noise signal of constant average intensity may be used.

The peak-reading meter 19 is shown in detail in Figure 4 and includes a pair of input terminals 75 connected to ground and to the anode of a diode 76. The cathode of this diode is connected to ground through a network comprising a resistor 77 shunted by a capacitor 78. A meter 79 is connected between the cathode of the diode and ground, and is preferably a vacuum-tube voltmeter so as to present negligible current drain on the circuit. The time-constant of network 77, 78 is selected to be long relative to the intervals between the increased-amplitude portions of the signal of Figure 2, so that a steady signal of an amplitude substantially equal to the peak amplitude of these portions is impressed on meter 79. In this manner, meter 79 provides an indication of the value of level A of the signal shown in Figure 2, which signal is applied to input terminals 75.

In the embodiment of the invention shown in Figure 1, amplifier 17 must respond to the same intermediate frequency as the intermediate-frequency amplifier of the receiver under test. This may restrict the application of the noise-factor meter to a particular type of receiver. The modification illustrated in Figure 5 has wider application. This latter embodiment is similar to the meter of Figure 1 with the exception that it includes a buffer amplifier 35 and a heterodyne mixer 36 between the input terminals of the meter and its intermediate-frequency amplifier 17. Mixer 36 has an oscillator 37 associated therewith whose frequency is adjustable as indicated by a control 38. The buffer amplifier 35 is not necessary to the arrangement, although it is desirable that such a stage be included.

In this embodiment, although amplifier 17 still responds to a selected intermediate frequency, the meter may be used to test receivers having intermediate-frequency amplifiers selective to signal frequencies different from that of amplifier 17. In each case, oscillator 37 is adjusted so that mixer 36 heterodynes the signal derived from the receiver under test to the selected intermediate-frequency amplifier 17.

Automatic-gain-control circuit 20 is shown to be of the gated type and keyed by generator 23 so that the gain of intermediate-frequency amplifier 17 is controlled only during intervals when noise-signal generator 25 is disabled. However, the AGC circuit may be of any well-known type and is not necessarily gated. Of course, the time constant of the AGC circuit, if not gated, must be such that the increased amplitude portions of the signal shown in Figure 2 have no appreciable effect on the gain of the amplifier. With such an arrangement it is desirable that the intervals of the increased-amplitude portions of the signal of Figure 2 be short relative to the intervals of the decreased-amplitude portions, and that the time constant of the AGC circuit be short relative to the latter intervals. When desired, the noise-signal generator and gated AGC circuit may be keyed by a manual keying arrangement. The noise-factor meter has been shown as including an intermediate-frequency amplifier 17 followed by a signal detector 18, since it is customary to utilize the intermediate-frequency signal of a receiver for noise-factor measurements. However, it is possible to use the detected output signal of the receiver for such purposes, and in such cases the frequency characteristic of amplifier 17 is selected to apply audio signals directly to meter 19 and to AGC circuit 20.

The invention provides, therefore, a meter assembly which is capable of measuring directly the noise factor of apparatus such as radio receivers, television receivers and the like, and is especially useful in the manufacturing and testing of such receivers.

While particular embodiments of the invention have been shown and described, modifications may be made and it is intended in the appended claims to cover all such modifications as fall within the true spirit and scope of the invention.

I claim:

1. A metering system for measuring the noise-factor of a wave-signal receiver and the like comprising: an amplifier having an input circuit for receiving signals from the receiver to be measured and further having an output circuit; a noise signal generator for applying to the receiver to be measured and during spaced operating intervals an input signal of substantially constant intensity; a gain control circuit coupled to said amplifier for establishing the intensity of the signal output of said amplifier at a reference level and responsive only during intervals interposed between said spaced intervals; and a peak-reading device coupled to said output circuit of said amplifier for indicating the peak amplitude of the signal output of said amplifier.

2. A metering system for measuring the noise-factor of a wave-signal receiver and the like comprising: an amplifier having an input circuit for receiving signals from the receiver to be measured and further having an output circuit; a noise signal generator for applying to the receiver to be measured and during spaced operating intervals an input signal of substantially constant intensity; a gain control circuit coupled to said amplifier for establishing the intensity of the signal output of said amplifier at a reference level; means for gating said gain control circuit to render it responsive only during intervals interposed between said spaced intervals; and a peak-reading device coupled to said output circuit of said amplifier for indicating the peak amplitude of the signal output of said amplifier.

3. A metering system for measuring the noise-factor of a wave-signal receiver and the like comprising: an amplifier having an input circuit for receiving signals from the receiver to be measured and further having an output circuit; a noise signal generator for applying to the receiver to be measured an input signal of substantially constant intensity; a gain control circuit coupled to said amplifier for establishing the intensity of the signal output of said amplifier at a reference level; a periodic-wave generator for applying oppositely phased keying signals to said noise signal generator and to said gain control circuit to activate said noise signal generator during spaced operating intervals and to render said gain control circuit responsive only during intervals interposed between said spaced intervals; and a peak-reading device coupled to said output circuit of said amplifier for indicating the peak amplitude of the signal output of said amplifier.

4. A metering system for measuring the noise-factor of a superheterodyne wave-signal receiver comprising: an intermediate-frequency amplifier having an input circuit for receiving intermediate-frequency signals from the receiver to be measured and further having an onutput circuit; a noise signal generator for applying to the receiver to be measured an input signal of substantially constant intensity; a gain control circuit coupled to said amplifier for establishing the intensity of the signal output of said amplifier at a reference level; a periodic-wave generator for applying oppositely phased keying signals to said noise signal generator and to said gain control circuit to activate said noise signal generator during spaced operating intervals and to render said gain control circuit responsive only during intervals interposed between said spaced intervals; a detector coupled to the output circuit of said intermediate-frequency amplifier; and a peak-reading device coupled to said detector for indicating the peak amplitude of the signal output of said detector.

5. A metering system for measuring the noise factor of a superheterodyne wave-signal receiver comprising: a mixer amplifier having an input circuit for receiving intermediate-frequency signals from the receiver to be measured and further having an output circuit; an intermediate-frequency amplifier of a selected pass-band having an input circuit coupled to said output circuit of said mixer and further having an output circuit; a heterodyne oscillator coupled to said mixer for heterodyning the intermediate-frequency signals from the receiver to be measured to a frequency corresponding to the selected pass-band of said intermediate-frequency amplifier; a noise signal generator for applying to the receiver to be measured an input signal of substantially constant intensity; a gain control circuit coupled to said intermediate-frequency amplifier for establishing the intensity of the signal output of said intermediate-frequency amplifier at a reference level; a periodic-wave generator for applying oppositely phased keying signals to said noise signal generator and to said gain control circuit to activate said noise signal generator during spaced operating intervals and to render said gain control circuit responsive only during intervals interposed between said spaced intervals; a detector coupled to the output circuit of said intermediate-frequency amplifier; and a peak-reading device coupled to said detector for indicating the peak amplitude of the signal output of said detector.

ALBERT COTSWORTH, III.

REFERENCES CITED

The following references are of record in the file of this patent:

UNITED STATES PATENTS

| Number | Name | Date |
|---|---|---|
| 2,418,143 | Stodola | Apr. 1, 1947 |
| 2,464,258 | Prichard | Mar. 15, 1949 |
| 2,466,959 | Moore | Apr. 12, 1949 |